3 Sheets—Sheet 1.

B. A. LEGG.

Assignor to THE LECHNER MANUFACTURING COMPANY.

MINING MACHINE.

No. 10,818. Reissued Mar. 15, 1887.

Witnesses:
J. C. Turner
J. S. Barker.

Inventor:
Benjamin A. Legg
by Doubleday & Bliss atty.

3 Sheets—Sheet 2.

B. A. LEGG.

Assignor to THE LECHNER MANUFACTURING COMPANY.

MINING MACHINE.

No. 10,818. Reissued Mar. 15, 1887.

Witnesses:
J. C. Turner
J. S. Barker.

Inventor:
Benjamin A. Legg
by Dumbleday & Blizzard

B. A. LEGG.

Assignor to THE LECHNER MANUFACTURING COMPANY.

MINING MACHINE.

No. 10,818. Reissued Mar. 15, 1887.

Witnesses:
J. C. Turner
J. S. Barker

Inventor:
Benjamin A. Legg
by Doubleday & Blackatty

UNITED STATES PATENT OFFICE.

BENJAMIN A. LEGG, OF COLUMBUS, OHIO, ASSIGNOR TO THE LECHNER MANUFACTURING COMPANY, OF SAME PLACE.

MINING-MACHINE.

SPECIFICATION forming part of Reissued Letters Patent No. 10,818, dated March 15, 1887.

Original No. 299,655, dated June 3, 1884. Application for reissue filed November 30, 1885. Serial No. 184,959.

*To all whom it may concern:*

Be it known that I, BENJAMIN A. LEGG, a citizen of the United States, residing at Columbus, in the county of Franklin and State of Ohio, have invented certain new and useful Improvements in Mining-Machines; and I do hereby declare the following to be a full, clear, and exact description of the invention, that will enable others skilled in the art to which it appertains to make and use the same, reference being had to the accompanying drawings, and to letters of reference marked thereon, which form a part of this specification.

Figure 1:
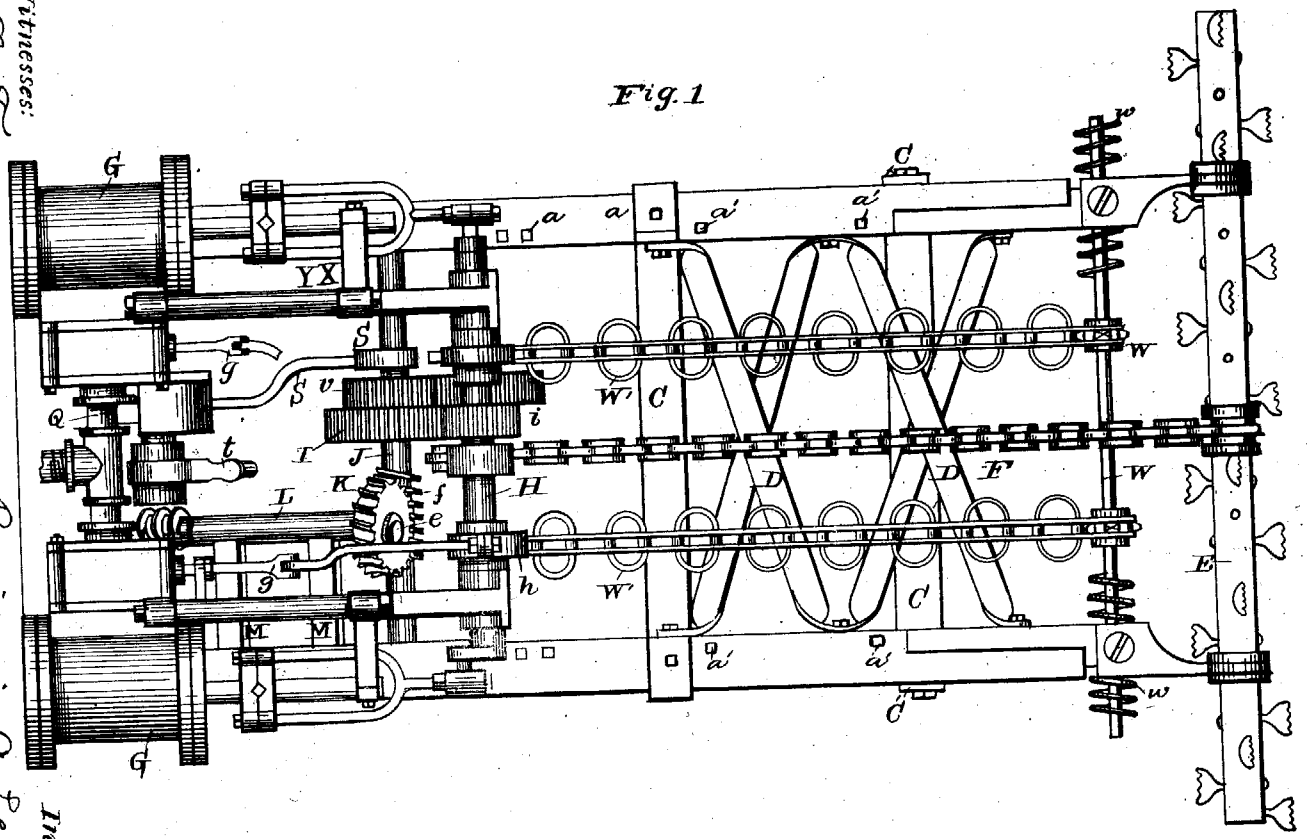
Figure 2:
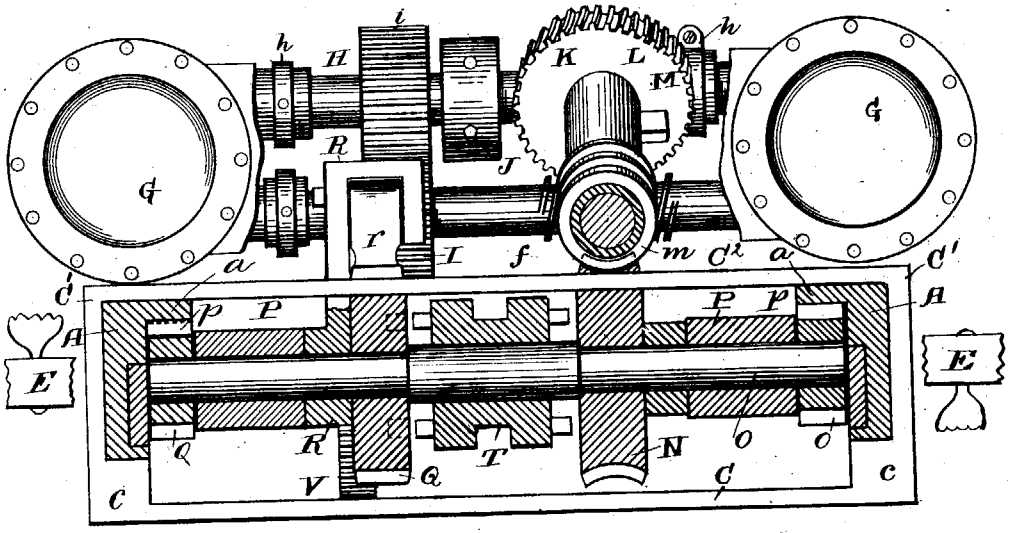
Figure 4:
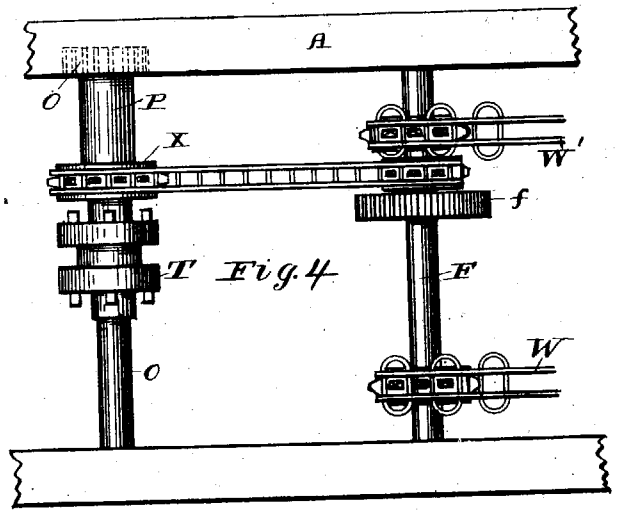
Figure 3:
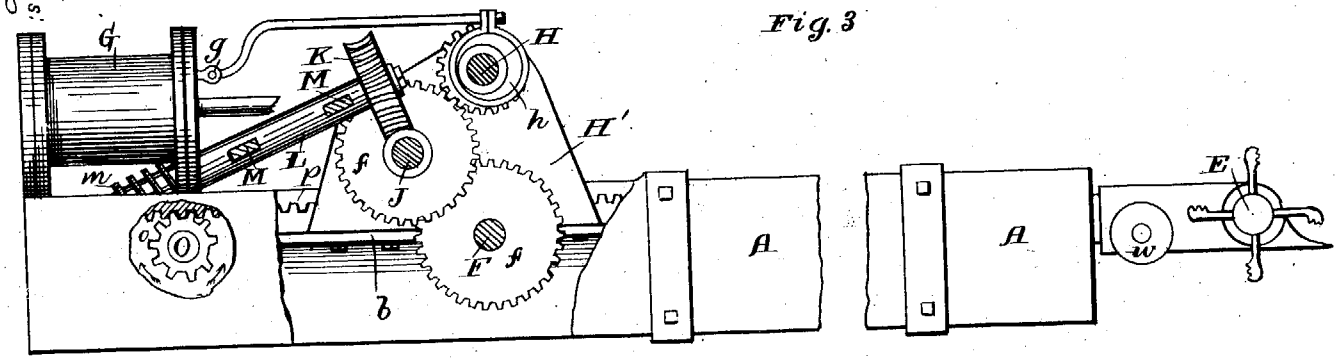
Figure 6:
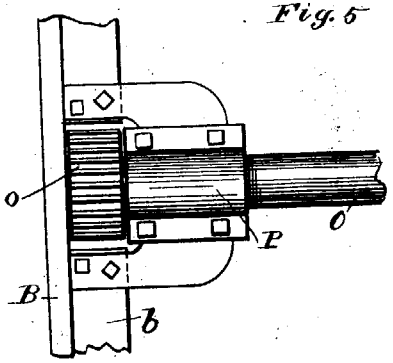

Figure 1 is a plan view of my improved machine. Fig. 2 is a rear view, partly in section. Fig. 3 is a side view, partly in section, showing parts of the invention. Fig. 4 is a detached view showing a modification of devices for moving the cutters backward. Fig. 5 is a detached view showing in plan the method of supporting the ends of one of the shafts.

The improvements relate, chiefly, to the mode of constructing the stationary frame-work or bed of the machine, its sliding cutter-frame, and the mechanism for advancing the cutter-bar into the coal and withdrawing it therefrom.

A A are the side pieces of the stationary frame or bed, and are commonly called by me "channel-bars," because of their being provided upon their inner faces with channels or grooves to receive and support T-bars B *b*, to be hereinafter described. Each channel-bar is provided upon its upper edge with an inwardly-projecting flange, *a*, to which there is secured a cogged rack-bar, to be described. These channel-bars are connected with each other and supported at suitable distances apart by means of girts C C′, with the additional girt or tie $C^2$ at the rear end of the machine, and, when desired, a corresponding one at the front end thereof, the girts being securely bolted to the channel-bars at suitable intervals. As indicated in Fig. 2, blocks *c c* are formed upon the lower members, C, of the girts to furnish additional support for the channel-bars, and, when preferred, the girt C C′ C′ $C^2$ may be cast or forged in one continuous piece of metal—either of wrought-iron or of cast-iron. As shown in Fig. 1, the central girt has its side portions, C′ C′, bent over and bolted to the upper flange of the channel-bar, while the one which is nearest to the front end of the machine has its side portions, C′ C′, cut off even with the upper surfaces of the channel-bars. The vertical webs B B of the T-bars fit closely the grooves in the inner faces of the channel-bars, their horizontal webs *b b* being of such width as to facilitate the bolting of many of the operative parts of the machine, the bearings for the shafts, and the diagonal braces D D thereto, these braces being by preference bolted to the inner edges of the webs or flanges *b b*.

E is the cutter-bar, mounted in bearings attached to shoes at the forward ends of the sliding cutter-frame.

F (see Fig. 3) is the chain-driving shaft, mounted at its ends in suitable bearings bolted to the T-bars, and F′ is the driving-chain connecting the shaft F with the cutter-bar, both of which may, if desired, be provided with sprocket-wheels to receive the chain.

G G are the cylinders, located at the rear end of the sliding cutter-frame.

H is the crank-shaft, carrying the eccentrics *h h*, which are connected with the valve-stems *g g* by means of eccentric-rods.

For convenience in construction and arrangement of parts I usually prefer to connect the eccentric-rod at the right hand of Figs. 1 and 2 to the upper portion of the eccentric-straps, the eccentric-rod at the left of these figures being arranged on a line intersecting the axis of the crank-shaft horizontally; but any usual or preferred construction of these parts may be adopted.

For the purpose of supporting a portion of the shafts of the machine, I propose to employ vertical bearing-plates H′, (see Fig. 3,) one upon each side of the machine; or a skeleton frame-work or bracket may be used for this purpose, said plates or skeletons being bolted to the T-bars; and when desired these plates or brackets may be united with each other by suitable transverse girts to further stiffen the frame.

*i* is a pinion on the crank-shaft, meshing with the spur-gear I on a secondary shaft, J, which carries a worm, *f*. This worm engages with a worm-wheel, K, mounted upon the forward upper end of an inclined shaft, *l*, which is supported in a sleeve, L, the sleeve being in turn supported by means of arms or bearers M M, which latter may be either bolted to the T-bars, or they may be cast in one piece with one of the cylinders or its steam-chest; or they may be made in one and the same piece with one of the plates or brackets H'.

*m* is a worm on the rear lower end of shaft *l* and made to engage with and rotate a worm-wheel, N, mounted loosely upon the cross-shaft O, the bearings P of which are also attached to the T-bars; or these bearings may consist of boxes, one member of each of which is cast with one of the cylinders. The shaft O is of increased diameter at the center, so as to form shoulders, between one of which and the bearer P the worm-wheel N is supported against lateral movement; or collars may be secured to the shaft—one on either side of the worm-wheel.

*o o* are spur-pinions keyed to the ends of the shaft O O, and meshing with cogged racks *p p*, which are firmly bolted to the under sides of the flanges *a a* of the channel-bars. In Fig. 5 I have illustrated one method which I propose to employ for supporting the outer ends of the shaft O, in which figure the bearing P is represented as being constructed with outwardly-projecting arms, which are bolted to the upper surface of the horizontal web *b* of the T-bar, a portion of which is cut away to receive the end of the shaft and the pinion carried thereby, so that it shall mesh properly with the cogged rack *p*. By preference the arms of the box P are cast in one and the same piece with the lower half of the box, which may be divided centrally of the shaft, the upper half or cap being bolted to the lower half, as is customary in boxes thus constructed. By preference I make these cogged racks in short sections; but they might be formed integrally with the channel-bars, if desired. I do not wish, however, to be limited to the exact position shown of these cogged racks, because they might be arranged below the pinions, although I prefer to place them above, in order to guard against their becoming filled with coal-dust or other material.

Q is a ratchet-wheel mounted loosely upon shaft O at the opposite end of the enlarged central portion.

R is a swinging bent arm or strap, the lower end of which is mounted upon shaft O, its upper end being U-shaped to receive the upper end of the pawl, which is pivoted therein, as plainly indicated in Figs. 1 and 2, in such position that the lower free end of the pawl engages with the teeth of ratchet-wheel Q. The combined thickness of the ratchet-wheel and the lower end of the arm R is equal to the distance between the adjacent bearing P and shoulder of the shaft O, so that lateral movement of the wheel and arm relative to said shaft is prevented.

S is an eccentric rod or link connecting the bent arm R with an eccentric, *s*, on shaft J, so that as said shaft revolves the pawl imparts an intermittent rotary movement to the ratchet-wheel in the direction indicated by the arrow 2 in Fig. 3.

T is a double clutch-faced hub splined to shaft O, so as to rotate therewith, while free to slide thereon. The inner face of the worm-wheel N and the ratchet-wheel Q—that is, the faces of these wheels which are adjacent to the hub—are also ratchet-faced, so that when the ratchet teeth or lugs on the hub T are made to engage with the corresponding ratchet-teeth or lugs on worm-wheel N the cutter-frame is advanced and the cutter-bar is thrust into the coal; but when the ratchet teeth or lugs of the hub are caused to engage with the corresponding teeth or lugs of ratchet-wheel Q the cutter-frame and cutter-bar are moved backward and the cutter-bar is withdrawn from the coal.

It will be readily understood that by reason of the mechanism which connects shaft J with shaft O, being composed of worm-gearing, the rotation of shaft O in the direction indicated by arrow 1, Fig. 3, is very much slower than is the rotation of the said shaft O in the direction of arrow 2, same figure, the movement in this direction being produced by the pawl and ratchet-wheel, and by changing the length of throw of the eccentric, or by pivoting the pawl higher or lower in the arm R, the speed at which the cutter-bar is moved backward may be changed at will.

W is a clearing-chain shaft mounted in the cutter-frame, and W' are clearing-chains running from shaft W to shaft F and operating to withdraw the cuttings from the track of the machine.

*w w* are worms or conveyers on the outer ends of shaft W, for the purpose of drawing in the cuttings toward the center of the machine within reach of the clearing-chains.

As will be readily understood from an examination of Figs. 1 and 3, when the engines are running, the train of gearing which connects the engine-shaft with the chain-shaft F will rotate the said driving-chain shaft F, and through chain F' the cutter-bar, which is advanced slowly into the coal by means of the worm-gearing shaft O and cogged pinions and cogged rack, as has been explained, and when a cut of sufficient depth—say four or five feet—has been made the cutter-bar is withdrawn by means of the ratchet-wheel Q and mechanism connected therewith, as will be fully understood without further description; or, when preferred, the cutters may be withdrawn from the coal by means of the devices shown in Fig. 4, in which X is a sprocket-wheel mounted on shaft O and provided with a ratchet-faced hub adapted to engage with the corresponding part of the sliding clutch-faced hub T, the sprocket-wheel being mounted loosely on the shaft.

*x* is a chain connecting sprocket-wheel X with a corresponding sprocket-wheel or sprocket-teeth on the chain-driving shaft F, so that when the sliding hub T is connected with the sprocket-wheel X the cutters will be drawn from the coal without reversing the direction in which the engine is ordinarily running when cutting into the coal.

As I purpose to use any of the usual or approved devices for supporting the piston-rod, cross-heads, and forked pitman, these parts need not be specifically described, although in the drawings I have shown the outer ends of the piston-rods supported in brackets X′, mounted upon the outer ends of horizontal arms Y Y, which are rigidly attached at their rear ends to the steam-chests of the cylinders G G.

I am aware that channeling and other rock cutting and drilling machines have been constructed with cogged racks on the supporting-frame or bed-pieces, and with pinions meshing therewith to move the cutters in one or both directions relative to the said supporting bed-pieces.

I am also aware that Patent No. 43,943, Grier & Boyd, shows a supporting-frame and a sliding cutter-frame in combination with an advancing and withdrawing gearing connecting the cutter-frame with the stationary frame, and two trains of gearing connecting the advancing and withdrawing gearing with the power-shaft; but there are many important differences between that construction and mine. For instance, the shaft of my advancing and withdrawing gearing is non-sliding—that is to say, it has no endwise movement. Such movement would be seriously objectionable in many machines of the same general structure as mine, and would be impossible in some others—as, for instance, that shown in Patent No. 82,391, G. E. Donisthorpe—because of the engagement of the worm with the teeth of its coacting worm-wheel; hence my general organization of the two trains of gearing and my plan of connecting them alternately with the shaft of the advancing and withdrawing gearing possesses many advantages not found in prior construction. Again, in Grier & Boyd, from the fact that both of the wheels on their vertical shaft are made fast to the shaft, it is impossible for them to permanently connect both trains of gearing with their respective power-shafts, whereas in my machine both trains of gearing are driven continuously in opposite directions and at different rates of speed, thus avoiding the serious danger of breakage, which inevitably accompanies the throwing of two gears into and out of mesh with each other when the machine is running. Again, in Grier & Boyd, from the fact that both the gear-wheels, which are mounted on the vertical shaft, are rigidly connected with such shaft, it follows that if the power-shaft be driven at any such speed as is customary in mining-machines of the class to which mine belongs it would be practically impossible to reverse the direction of movement of the cutter-frame quickly by engaging the gear-wheels I J.

What I claim is—

1. In a mining-machine, the combination of a stationary frame, a cutter-frame, a continuously-rotating engine-shaft on the cutter-frame, an advancing and withdrawing gearing connecting the cutter-frame with the stationary frame to move the cutter-frame alternately in opposite directions and having a rotating non-sliding shaft, two trains of gearing connected to the engine-shaft and driven in opposite directions thereby, and means for connecting the non-sliding shaft of the feed-gearing alternately with either of the two trains of gearing, substantially as set forth.

2. In a mining-machine, the combination of a stationary frame, a cutter-frame, a continuously-rotating engine-shaft on the cutter-frame, an advancing and withdrawing gearing connecting the cutter-frame with the stationary frame and adapted to move the cutter-frame alternately in opposite directions, two trains of gearing connected to and driven by the engine shaft in opposite directions and at different rates of speed, a clutch mechanism for connecting the relatively fast-moving train with the advancing and withdrawing gearing, and a clutch mechanism for connecting the relatively slow-moving train with the advancing and withdrawing gearing, substantially as set forth.

3. In a mining-machine, the combination of a stationary frame, a cutter-frame, a continuously-rotating engine-shaft on the cutter-frame, an advancing and withdrawing gearing connecting the cutter-frame with the stationary frame to move the cutter-frame alternately in opposite directions and having a non-sliding shaft, two trains of gearing connected to and driven by the engine-shaft in opposite directions, each train of gearing having one wheel mounted loosely on the non-sliding shaft, and a clutch for connecting either of the trains of gearing alternately with said shaft, substantially as set forth.

4. In a mining-machine, the combination of a stationary frame, a cutter-frame, two horizontal cylinders arranged at the rear end of the cutter-frame, an engine-shaft between the cylinders and the cutters, and a second shaft below the engine-shaft and parallel therewith and geared to the engine-shaft for driving the cutters, an advancing and withdrawing gearing connecting the stationary frame and the cutter-frame, and two trains of gearing connecting the engine-shaft with the feed-gearing, substantially as set forth.

5. In a mining-machine, the combination of a stationary frame, a cutter-frame, a continuously-rotating engine-shaft on the cutter-frame, an advancing and withdrawing gearing connecting the cutter-frame with the stationary frame to move the cutter-frame alternately in opposite directions and having a rotating shaft, two trains of gearing connected to and driven in opposite directions by the engine-shaft, each train of gearing having one wheel mounted loosely on the shaft of the advancing and withdrawing gearing, and a clutch mounted on the shaft between the loosely-mounted wheels and adapted to connect either of them alternately with the shaft, substantially as set forth.

6. In a mining-machine, the combination of a stationary frame provided with rack-teeth in substantially the horizontal plane of its side bars, a cutter-frame, a continuously-rotating engine on the cutter-frame, an advancing and withdrawing gearing mounted on the cutter-frame and engaging with said rack-teeth, said gearing having a horizontal rotating shaft in substantially the horizontal plane of the cutter-frame, two trains of gearing connected to and driven by the engine shaft in opposite directions and at different rates of speed, and means for connecting the horizontal shaft alternately with either of the two trains of gearing, substantially as set forth.

7. In a mining-machine, the combination of a stationary frame, a cutter-frame, racks secured to the stationary frame, a non-sliding pinion-shaft, pinions mounted on said shaft and engaging with the racks, a worm continuously rotating in one direction, a worm-wheel mounted loosely upon the pinion-shaft, a clutch for connecting the worm with the pinion shaft, and gearing which connects the worm with the engine-shaft, substantially as set forth.

8. In a mining-machine, the combination of the stationary bed-frame having parallel side pieces, the sliding frame having its side bars fitted in the side pieces of the bed-frame and provided with inwardly-projecting ribs, the cutter-bar and cutters mounted across the front end of the sliding frame, means connecting the cutter bar with the engine shaft for driving the cutters, cogged racks projecting inward from the upper edges of the side pieces of the bed-frame, a horizontal shaft provided with pinions upon its outer ends meshing with the cogged racks, bearings for the horizontal shaft attached to the inward-projecting ribs of the sliding frame, an engine-shaft, and means connecting the engine-shaft with the horizontal shaft for advancing the cutters into the coal, substantially as set forth.

9. In a mining-machine, the combination of a stationary bed-frame having parallel side pieces, the sliding bed-frame having its side bars fitted to slide in the side pieces of the bed-frame, cogged racks projecting inward from the side pieces, a horizontal shaft supported at its ends in bearings which are attached to and project from the side bars of the sliding frame, the pinions mounted on the ends of the horizontal bars, between its bearings and the side pieces of the main frame, and openings in the side pieces of the sliding frame to receive the pinions, substantially as set forth.

10. In a mining-machine, the combination of a stationary bed-frame having parallel side pieces, the sliding frame having its side bars fitted to slide in the side pieces of the bed-frame, the cutter-bar mounted across the front ends of the sliding frame, means connecting the cutter-bar with the engine-shaft for driving the cutters, cogged racks projecting inward from the side pieces, a horizontal shaft supported between the side bars of the sliding frame and in the same horizontal plane, or thereabout, pinions mounted on the ends of the horizontal shaft, a continuously-rotating cogged gear mounted loosely on the horizontal shaft, and a clutch adapted to connect the continuously-rotating gear with the horizontal shaft, substantially as set forth.

11. In a mining-machine, the combination of a stationary bed-frame having parallel side pieces, the sliding frame having its side bars fitted to slide in the side pieces of the bed-frame, means connecting the cutter-bar with the engine-shaft for driving the cutters, the cutter-bar mounted across the front end of the sliding frame, cogged racks projecting inward from the side pieces, a horizontal shaft supported between the side bars of the sliding frame, two wheels mounted loosely on the horizontal shaft and rotating in opposite directions, and clutches adapted to connect the oppositely-rotating wheels with the horizontal shaft alternately, substantially as set forth.

12. In a mining-machine, the combination of a stationary bed-frame, a sliding frame carrying a cutter-bar and having its side bars fitted to slide on the bed-frame, cogged racks attached to the bed-frame, a horizontal shaft mounted on the sliding frame and carrying pinions which mesh with the cogged racks, two rotating wheels loosely mounted on the pinion-shaft, devices connecting one of the loosely-mounted wheels with the engine-shaft and adapted to advance with the cutter-bar slowly into the coal, and devices connecting the other loosely-mounted wheel with the engine-shaft for withdrawing the cutter-bar from the coal at a higher rate of speed, substantially as set forth.

In testimony whereof I affix my signature in presence of two witnesses.

BENJAMIN A. LEGG.

Witnesses:

ALEX. D. YOUNG,
JAMES J. INGLIS.